United States Patent
Mutikainen et al.

(10) Patent No.: US 8,543,060 B2
(45) Date of Patent: Sep. 24, 2013

(54) CLOSE-PROXIMITY WIRELESS COMMUNICATION TRANSFER

(75) Inventors: Jari Mutikainen, Lepsama (FI); Andrea Bacioccola, Helsinki (FI)

(73) Assignee: Nokia Corporation, Espoo (FI)

( * ) Notice: Subject to any disclaimer, the term of this patent is extended or adjusted under 35 U.S.C. 154(b) by 112 days.

(21) Appl. No.: 13/280,671

(22) Filed: Oct. 25, 2011

(65) Prior Publication Data

US 2013/0102250 A1     Apr. 25, 2013

(51) Int. Cl.
*H04B 7/00* (2006.01)

(52) U.S. Cl.
USPC .... 455/41.2; 455/567; 455/168.1; 455/182.2; 340/5.61

(58) Field of Classification Search
USPC .................. 455/41.2, 567, 168.1, 551, 164.1, 455/182.2, 13.3, 563, 575.1; 340/5.61; 713/156
See application file for complete search history.

(56) References Cited

U.S. PATENT DOCUMENTS

| | | | |
|---|---|---|---|
| 4,677,653 A * | 6/1987 | Weiner et al. ................. | 455/551 |
| 6,128,286 A * | 10/2000 | Leopold et al. ............... | 370/316 |
| 6,161,005 A * | 12/2000 | Pinzon .......................... | 455/403 |
| 7,206,612 B2 * | 4/2007 | Suzuki .......................... | 455/567 |
| 7,215,240 B2 * | 5/2007 | Uehara ....................... | 340/425.5 |
| 7,447,513 B2 | 11/2008 | Anttila et al. | |
| 7,536,157 B2 * | 5/2009 | Wood et al. ................... | 455/103 |
| 7,757,076 B2 * | 7/2010 | Stewart et al. ................ | 713/156 |
| 7,775,432 B2 | 8/2010 | Jalkanen et al. | |
| 7,937,070 B2 * | 5/2011 | Stendal ......................... | 455/411 |
| 8,204,096 B2 * | 6/2012 | Lin et al. ....................... | 375/136 |
| 2001/0027098 A1 * | 10/2001 | Suzuki .......................... | 455/415 |
| 2001/0053709 A1 * | 12/2001 | Terasaka ...................... | 455/567 |
| 2005/0152294 A1 * | 7/2005 | Yu et al. ........................ | 370/310 |
| 2005/0210283 A1 * | 9/2005 | Kato ............................. | 713/200 |
| 2006/0040692 A1 | 2/2006 | Anttila et al. | |
| 2006/0246882 A1 | 11/2006 | Frank et al. | |
| 2010/0315678 A1 * | 12/2010 | Smires et al. ................ | 358/1.15 |
| 2013/0013508 A1 * | 1/2013 | Carlson ......................... | 705/44 |

* cited by examiner

*Primary Examiner* — Minh D Dao
(74) *Attorney, Agent, or Firm* — Locke Lord LLP

(57) ABSTRACT

A system for transferring active communication sessions between apparatuses. In at least one example implementation, a first apparatus may receive information including at least identity information corresponding to a second apparatus via close-proximity wireless communication. The receipt of the identity information may then trigger the first apparatus to determine whether it is already in a communication session. If it is determined that the first apparatus is in a communication session, it may be further determined, based on the identity information, whether automatic transfer of the communication session is permitted. If the first apparatus determines that the automatic transfer is permitted, the first apparatus may then initiate a transfer of the communication session to the second apparatus.

25 Claims, 6 Drawing Sheets

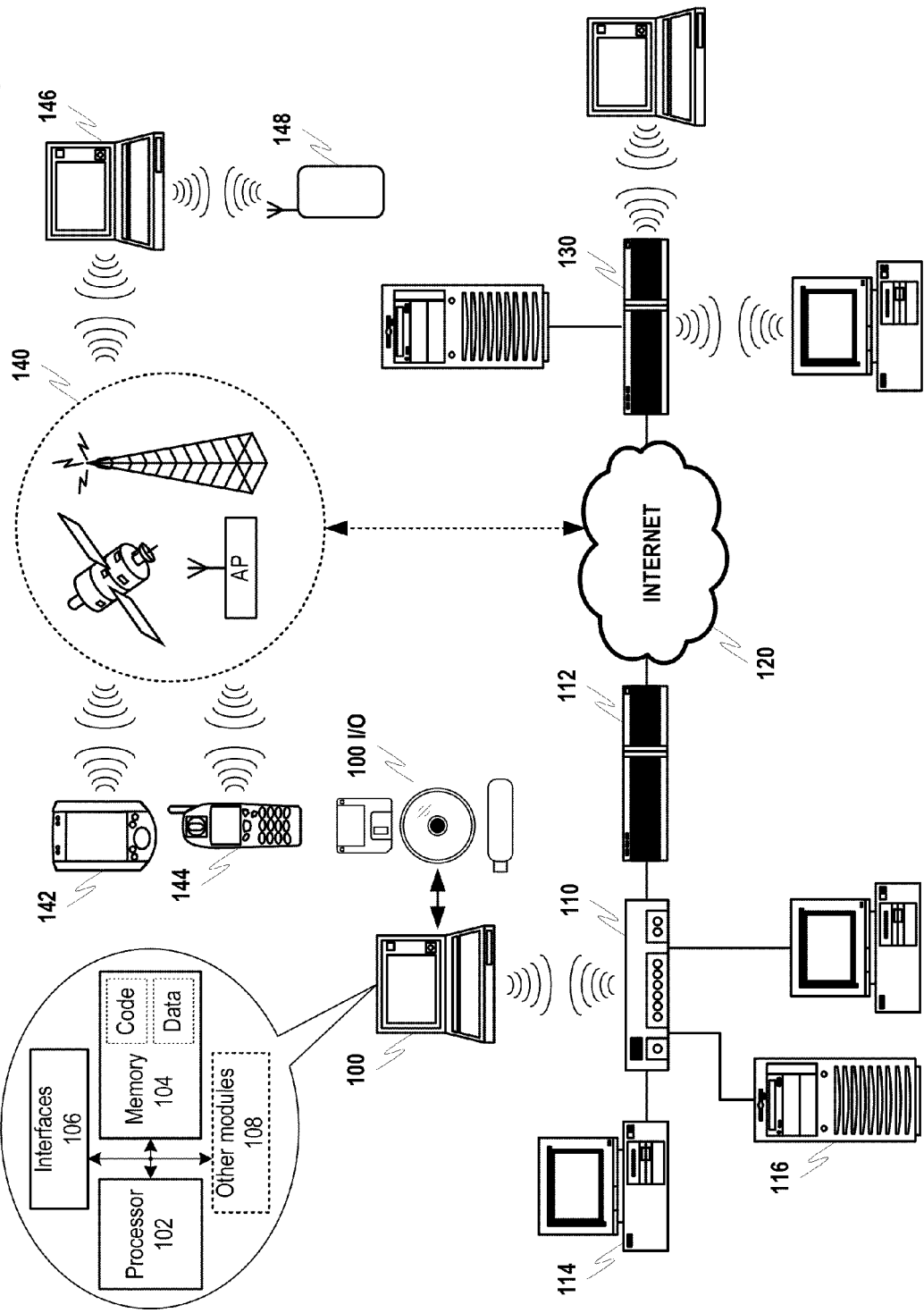

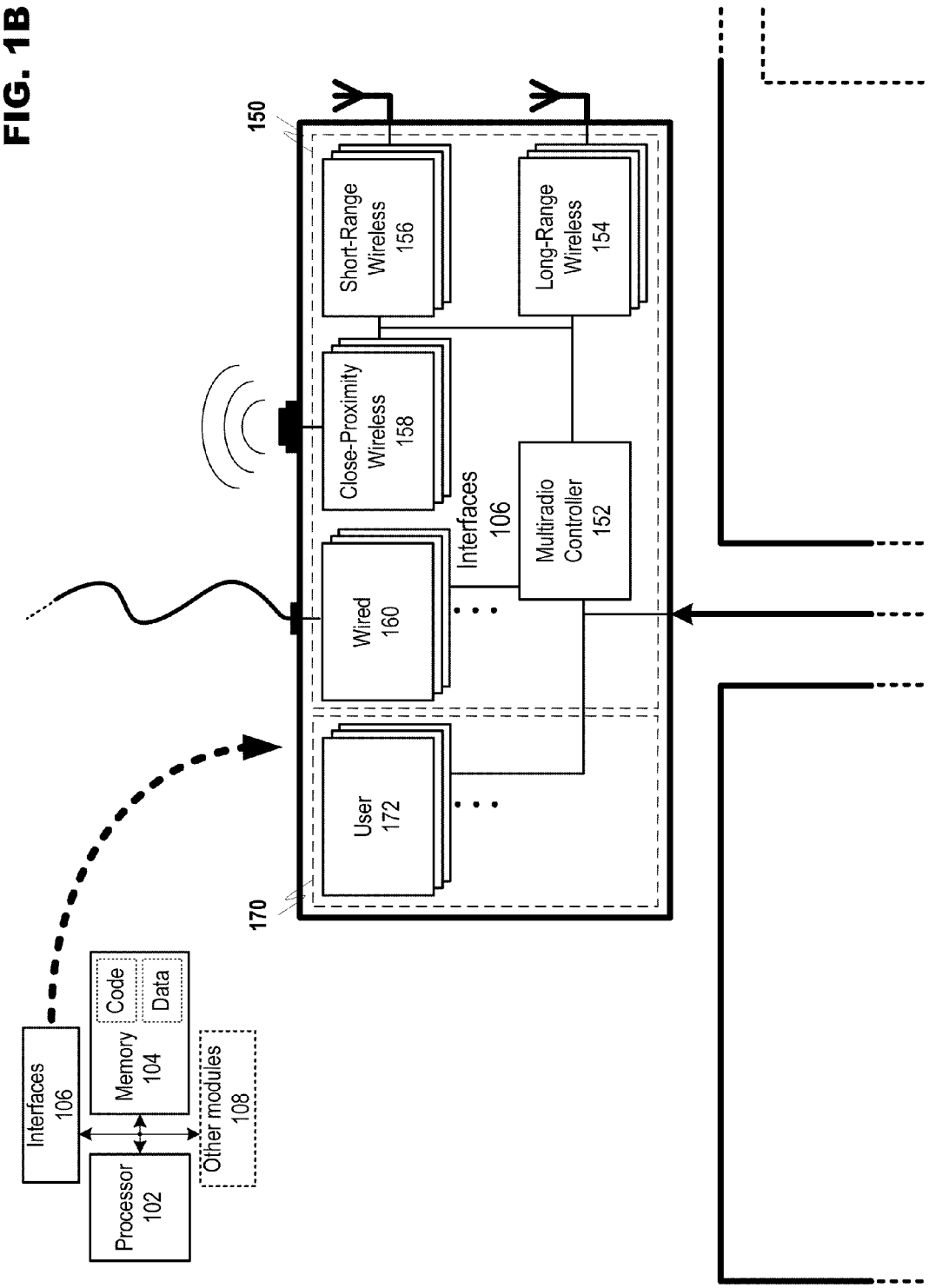

CLOSE-PROXIMITY WIRELESS COMMUNICATION TRANSFER

BACKGROUND

1. Field of Invention

The present invention relates to wireless communication, and in particular, to facilitating transfer of a communication session between apparatuses via wireless interaction.

2. Background

Electronic communications have evolved to a point where they are no longer tied to any particular medium. For example, simple telecommunications over wired carriers have now given way to high-capacity wireless systems. Wireless mobile apparatuses (e.g., cellular handsets, smartphones, etc.) may provide communication for various services. In addition to the wireless communication of voice, these apparatuses may be enabled to wirelessly exchange data in support of various functionalities in areas such as location and navigation, productivity, social media, entertainment, etc. These example functionalities may be supported through a variety of wired and wireless communication mediums that may be simultaneously active within a device. Wireless communication mediums may operate over different ranges and in different capacities, making some wireless communication mediums more appropriate in view of the designated use.

At least one challenge presented by the above evolution of new communication technology is making different technologies work together. Users often rely upon a combination of different apparatuses throughout their day. For example, a user may default to using landline communication when stationary (e.g., at home, at the workplace, etc.) due to various advantages such as lower (or possibly no) usage cost, improved performance, improved security, allows for reserving mobile apparatus resources (e.g., battery life), etc. Then, when users are mobile (e.g., commuting to work, school, errands, etc.) they may rely upon wireless communication devices such as mobile handsets, smart phones, etc. In addition, users may have more than one apparatus of a particular type, such as two wireless communication devices, because one apparatus may be dedicated to work use while another apparatus is for personal use. Groups of users may also interact wirelessly wherein each user in the group has their own wireless communication device.

One example interaction is transferring an active communication session between apparatuses. In view of the above, such transfers may occur between a landline apparatus and a wireless apparatus, between wireless apparatuses, etc. A readily apparent benefit would be the ability to continue an important conversation initiated at a first fixed location (e.g., at home over a landline connection) while commuting to a second location (e.g., while driving to work) and then while at the second location via a different communication medium (e.g., at the office via a voice-over-internet-protocol (VoIP) connection). Another possible usage scenario would be the ability to pass an active communication between wireless apparatuses (e.g., to a friend's wireless handset). While such interaction may currently be possible, the manual configuration involved in instructing the apparatuses on the desired conveyance may be cumbersome to even advanced users, may negatively impact user experience, and thus, may prove prohibitive to regular usage.

SUMMARY

Various example embodiments of the present invention may be directed to a method, apparatus, computer program product and system for transferring active communication sessions between apparatuses. In at least one example implementation, a first apparatus may receive information including at least identity information corresponding to a second apparatus via close-proximity wireless communication. The receipt of the identity information may then trigger the first apparatus to determine whether it is already in a communication session. If it is determined that the first apparatus is in a communication session, it may be further determined, based on the identity information, whether automatic transfer of the communication session is permitted. If the first apparatus determines that the automatic transfer is permitted, the first apparatus may then initiate a transfer of the communication session to the second apparatus.

In accordance with at least one embodiment of the present invention, the identity information corresponding to the second apparatus may be received in the first apparatus due to the first apparatus initially transmitting a message to the second apparatus. The initial message from the first apparatus may request identity information corresponding to the second apparatus for use in transferring the communication session. The identity information may comprise an address usable for communicating with the second apparatus via an alternative form of wireless communication such as Bluetooth. In instances where Bluetooth is employed following the initial close-proximity wireless communication, the first apparatus may communicate with the second apparatus via Bluetooth in order to obtain additional information, such as information usable for transferring the communication session (e.g., apparatus configuration information).

If in the first apparatus it is determined that automatic transfer is not permitted, the first apparatus may further determine whether a transfer-related user interface application is active, and if determined to be active, whether the transfer-related user interface application requires user confirmation. If it is determined in the first apparatus that the transfer-related user interface application requires user confirmation, the first apparatus may display information inquiring as to whether transferring the communication session is permitted. In accordance with at least one embodiment of the present invention, initiating a transfer of the communication session to the second apparatus may comprise transmitting a message from the first apparatus to the remote entity, the message requesting transfer of the communication session to the second apparatus. The first message may then receive a response from the second apparatus, and may determine whether transfer of the communication session is permitted based on the response message. If it is determined by the first apparatus that transfer of the communication session is permitted, the communication session may then be terminated in the first apparatus.

The foregoing summary includes example embodiments of the present invention that are not intended to be limiting. The above embodiments are used merely to explain selected aspects or steps that may be utilized in implementations of the present invention. However, it is readily apparent that one or more aspects, or steps, pertaining to an example embodiment can be combined with one or more aspects, or steps, of other embodiments to create new embodiments still within the scope of the present invention. Therefore, persons of ordinary skill in the art would appreciate that various embodiments of the present invention may incorporate aspects from other embodiments, or may be implemented in combination with other embodiments.

DESCRIPTION OF DRAWINGS

The invention will be further understood from the following description of various example embodiments, taken in conjunction with appended drawings, in which:

FIG. 1A discloses example apparatuses, systems, configurations, etc. that may be utilized when implementing the various embodiments of the present invention.

FIG. 1B discloses further detail regarding an example apparatus configuration that may be utilized when implementing the various embodiments of the present invention.

DESCRIPTION OF EXAMPLE EMBODIMENTS

Figure 2:
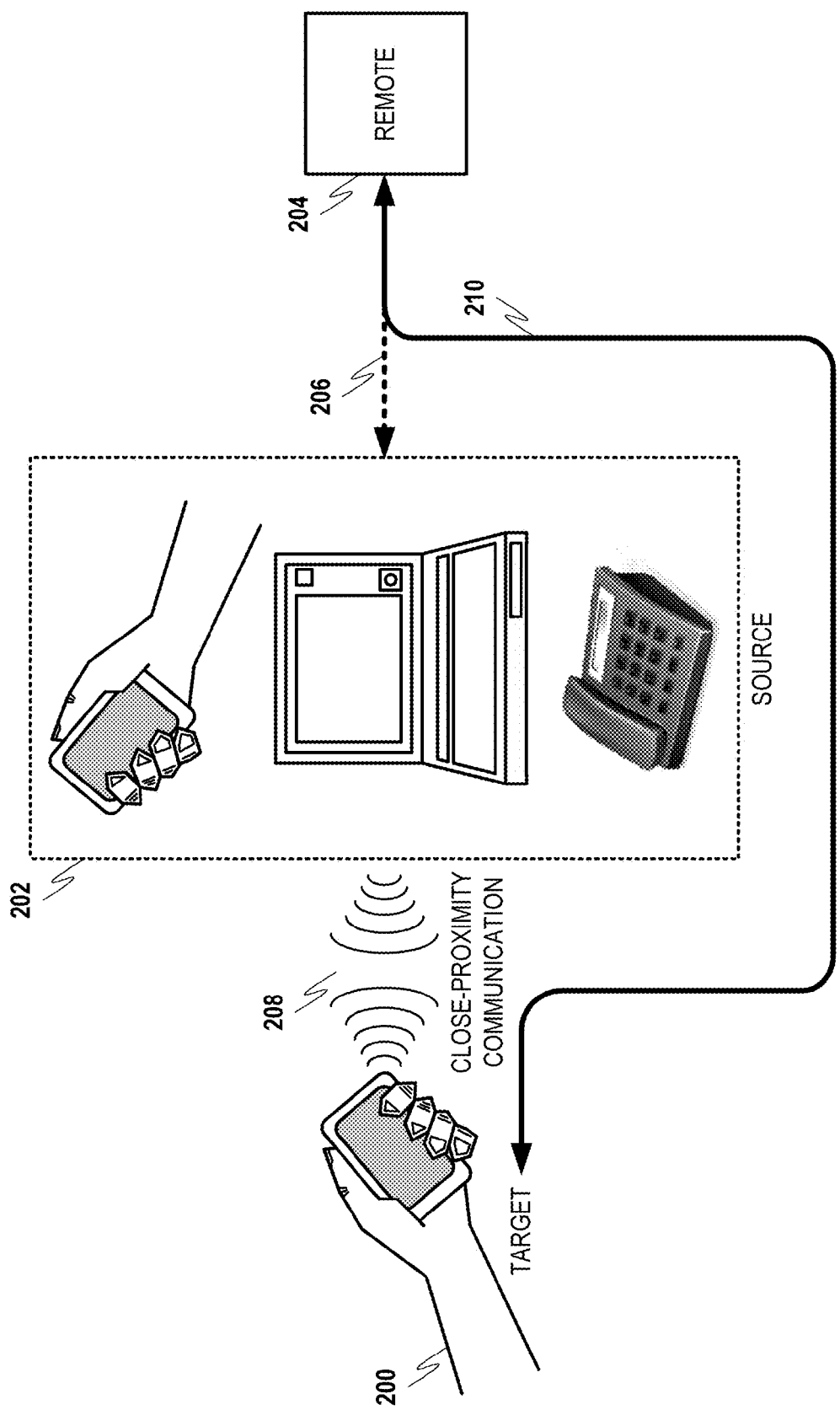
FIG. 2 discloses an example communication session transfer between apparatuses in accordance with at least one embodiments of the present invention.

While the invention has been described below in terms of a multitude of example embodiments, various changes can be made therein without departing from the spirit and scope of the invention, as described in the appended claims.

I. Example System with which Embodiments of the Present Invention May be Implemented An example of a system that is usable for implementing various embodiments of the present invention is disclosed in FIG. 1A. The system comprises elements that may be included in, or omitted from, configurations depending, for example, on the requirements of a particular application, and therefore, is not intended to limit present invention in any manner.

Computing device 100 is represented simply as a laptop computer in FIG. 1A, but may in actuality be any type of computing apparatus comprising at least elements 102-108 (e.g., mobile wireless communicator, cell phone, smartphone, tablet-type computer, etc.) Elements 102-108 correspond to basic categories of subsystems that may support operation in computing device 100. For example, Processor 102 may include one or more devices configured to execute instructions. In at least one scenario, the execution of program code (e.g., groups of computer-executable instructions stored in a memory) by processor 102 may cause computing device 100 to perform processes including, for example, method steps that may result in data, events or other output activities. Processor 102 may be a dedicated (e.g., monolithic) microprocessor device, or may be part of a composite device such as an ASIC, gate array, multi-chip module (MCM), etc.

Processor 102 may be electronically coupled to other functional components in computing device 100 via a wired or wireless bus. For example, processor 102 may access memory 104 in order to obtain stored information (e.g., program code, data, etc.) for use during processing. Memory 104 may generally include removable or fixed imbedded memories (e.g., non-transitory computer readable storage media) that operate in a static or dynamic mode. Further, memory 104 may include read only memories (ROM), random access memories (RAM), and rewritable memories such as Flash, EPROM, etc. Examples of removable storage media based on magnetic, electronic and/or optical technologies are shown at 100 I/O in FIG. 1A, and may serve, for instance, as a data input/output means for computing device 100. Code may include any interpreted or compiled computer language including computer-executable instructions. The code and/or data may be used to create software modules such as operating systems, communication utilities, user interfaces, more specialized program modules, etc.

One or more interfaces 106 may also be coupled to various components in computing device 100. These interfaces may allow for inter-apparatus communication (e.g., a software or protocol interface), apparatus-to-apparatus communication (e.g., a wired or wireless communication interface) and even apparatus to user communication (e.g., a user interface). These interfaces allow components within computing device 100, other apparatuses and users to interact with computing device 100. Further, interfaces 106 may communicate machine-readable data, such as electronic, magnetic or optical signals embodied on a computer readable medium, or may translate the actions of users into activity that may be understood by computing device 100 (e.g., typing on a keyboard, speaking into the receiver of a cellular handset, touching an icon on a touch screen device, etc.). Interfaces 106 may further allow processor 102 and/or memory 104 to interact with other modules 108. For example, other modules 108 may comprise one or more components supporting more specialized functionality provided by computing device 100.

Computing device 100 may interact with other apparatuses via various networks as further shown in FIG. 1A. While wireless interaction has been disclosed between computing device 100 and hub 110, it may also be possible for computing device 100 to engage in wired communication (e.g., via Ethernet). For example, hub 110 may provide wired and/or wireless support to devices such as computer 114 and server 116. Hub 110 may be further coupled to router 112 that allows devices on the local area network (LAN) to interact with devices on a wide area network (WAN, such as Internet 120). In such a scenario, another router 130 may transmit information to, and receive information from, router 112 so that devices on each LAN may communicate. Further, all of the components depicted in this example configuration are not necessary for implementation of the present invention. For example, in the LAN serviced by router 130 no additional hub is needed since this functionality may be supported by the router.

Further, interaction with remote devices may be supported by various providers of short and long range wireless communication 140. These providers may use, for example, long range terrestrial-based cellular systems and satellite communication, and/or short-range wireless access points in order to provide a wireless connection to Internet 120. For example, personal digital assistant (PDA) 142 and cellular handset 144 may communicate with computing device 100 via an Internet connection provided by a provider of wireless communication 140. Similar functionality may be included in devices, such as laptop computer 146, in the form of hardware and/or software resources configured to allow short and/or long range wireless communication. Further, any or all of the disclosed apparatuses may engage in direct interaction, such as in the short-range wireless interaction shown between laptop 146 and wireless-enabled apparatus 148. Example wireless enabled apparatuses 148 may range from more complex standalone wireless-enabled devices to peripheral devices for supporting functionality in apparatuses like laptop 146.

Further detail regarding example interface component 106 disclosed with respect to computing device 100 in FIG. 1A is now discussed regarding FIG. 1B. As previously set forth, interfaces 106 may include interfaces both for communicating data to computing apparatus 100 (e.g., as identified at 150) and other types of interfaces 170 including, for example, user interface 172. A representative group of apparatus-level interfaces is disclosed at 150. For example, multiradio controller 152 may manage the interoperation of long range wireless interfaces 154 (e.g., cellular voice and data networks), short-range wireless interfaces 156 (e.g., Bluetooth and WLAN networks), close-proximity wireless interfaces 158 (e.g., for interactions where electronic, magnetic, electromagnetic and optical information scanners interpret machine-readable data), wired interfaces 160 (e.g., Ethernet), etc. The example interfaces shown in FIG. 1B have been presented only for the sake of explanation herein, and thus, are not intended to limit the various embodiments of the present invention to utilization of any particular interface. Embodiments of the present invention may also utilize interfaces that are not specifically identified in FIG. 1B.

Multiradio controller 152 may manage the operation of some or all of interfaces 154-160. For example, multiradio controller 152 may prevent interfaces that could interfere with each other from operating at the same time by allocating specific time periods during which each interface is permitted to operate. Further, multiradio controller 152 may be able to process environmental information, such as sensed interference in the operational environment, to select an interface that will be more resilient to the interference. These multiradio control scenarios are not meant to encompass an exhaustive list of possible control functionality, but are merely given as examples of how multiradio controller 152 may interact with interfaces 154-160 in FIG. 1B.

II. Example Apparatus Interaction

Close-proximity wireless communications allows information to be transmitted between closely situated apparatuses (e.g., a few centimeters apart). Close-proximity wireless communication mediums may include, but are not limited to, infrared (IR) communication, radio frequency (RF) communication, optical readers (e.g., for bar codes and/or character recognition), etc. Near Field Communication (NFC) is one particular example of close-proximity wireless communication that employs RF communication in a manner similar to RF identification (RFID) communication systems in order to provide standardized wireless transactions over very short distances. In an example use situation, a user apparatus (e.g., a cellular handset) may be placed in close proximity to a billing apparatus (e.g., subway turnstile, vending machine, etc.), and in this manner payment may be made electronically through the exchange of information via NFC.

Example usage scenarios may, in accordance with at least one embodiment of the present invention, comprise the transfer of an ongoing voice call from one apparatus to another (e.g., from fixed to mobile communication apparatus), or from one user to another (e.g., from one family member to another, or amongst friends, colleagues, etc.). In the first example a user may desire to transfer an ongoing voice call from a computer connection (e.g., a VoIP call over a wired or wireless Ethernet connection to the Internet) to a mobile apparatus, for example when leaving a home or office. It may also be possible for a user to transfer an ongoing video call from a mobile apparatus to a teleconference system (e.g., a big screen television with a video camera) situated at a location into which the user enters. Currently the procedure for conducting such transfers is quite cumbersome. The source apparatus (e.g., an apparatus that is currently involved in an active communication session) needs to be aware of at least the address of the target apparatus, and then the apparatus user may need to manually enter the target address and possibly other communication-related information into a user interface of the source apparatus, if not previously stored in the phone book of the source apparatus, and then manually initiate the call transfer. Such procedures may be difficult for even experienced users. While some known systems may allow for initiation of conferencing and transfer functions via wireless interaction (e.g., see U.S. Pat. No. 7,447,513 B2, the contents of which are incorporated herein by reference), these systems may also have requirements that are problematic. For example, existing systems may require apparatuses being conferenced into a communication session, or that are receiving a transfer of the communication session, to have the ability to perform higher-level communication operations (e.g., interacting with network control entities). Such requirements do not exist in the various embodiments and example implementations of the present invention, as disclosed herein. As a result, an apparatus enabled for only basic wireless communication may be able to initiate, or at least receive, a transfer of a communication session ongoing between other apparatuses.

The various embodiment of present invention, as disclosed herein, pertain to the transfer of an active communication session such as, for example, a telephone call. Call transfer is a procedure where a user may transfer an ongoing call from one apparatus (e.g., a source) to a destination apparatus (e.g., target). An example call transfer is disclosed in FIG. 2. Source 202 and remote entity 204 may both be participating (e.g., active) in a communication session (e.g., call) as shown at 206, and a user may desire to transfer the call so that target 200 takes the place of source 202 in the call with remote entity 206 as shown at 210. Target 200, Source 202 and remote entity 204 may be any apparatus reachable via an E.164 address (e.g., telephone number) as defined by the International Telecommunication Union Telecommunication Standardization Sector (ITU-T) such as mobile communication device (e.g., mobile handset, smart phone, etc.) or a fixed telephone connected to a public switched telephone network (PSTN). In many protocols like the Global System for Mobile Communications (GSM), Circuit Switch (CS) communication (e.g., PSTN) or Integrated Services Digital Network (ISDN) it is not required that source 200 has an ongoing call with target 200. In voice over Internet protocol (VoIP) technologies like Session Initiation Protocol (SIP) or Skype, target 200 may be reached via an identity other than an E.164 address, like SIP Universal Resource Identifier (URI) or Skype user name.

III. Example Transfer of an Active Communication Session Via Close-Proximity Communication In accordance with at least one embodiment of the present invention, a transfer of a communication session may occur from a first apparatus (e.g., a source apparatus) to a second apparatus (e.g., a target apparatus), the transfer being perpetuated via a close-proximity wireless interaction that occurs between the source and target apparatuses. The close-proximity wireless interaction may occur as an NFC wireless transaction via which some or all of the configuration information (e.g., target apparatus address and other transfer-related information) may be sent to the source apparatus and/or a remote entity currently engaged in the communication session with the first apparatus. The configuration information may allow the remote entity to reestablish the communication session with the target apparatus, and then for the source apparatus to terminate its connection to the remote entity, effectively transferring the communication session to the target apparatus. Example types of communication sessions may include telephone calls (e.g., voice only), video calls (e.g., voice and visual images), or other types of electronic interaction.

Figure 3:
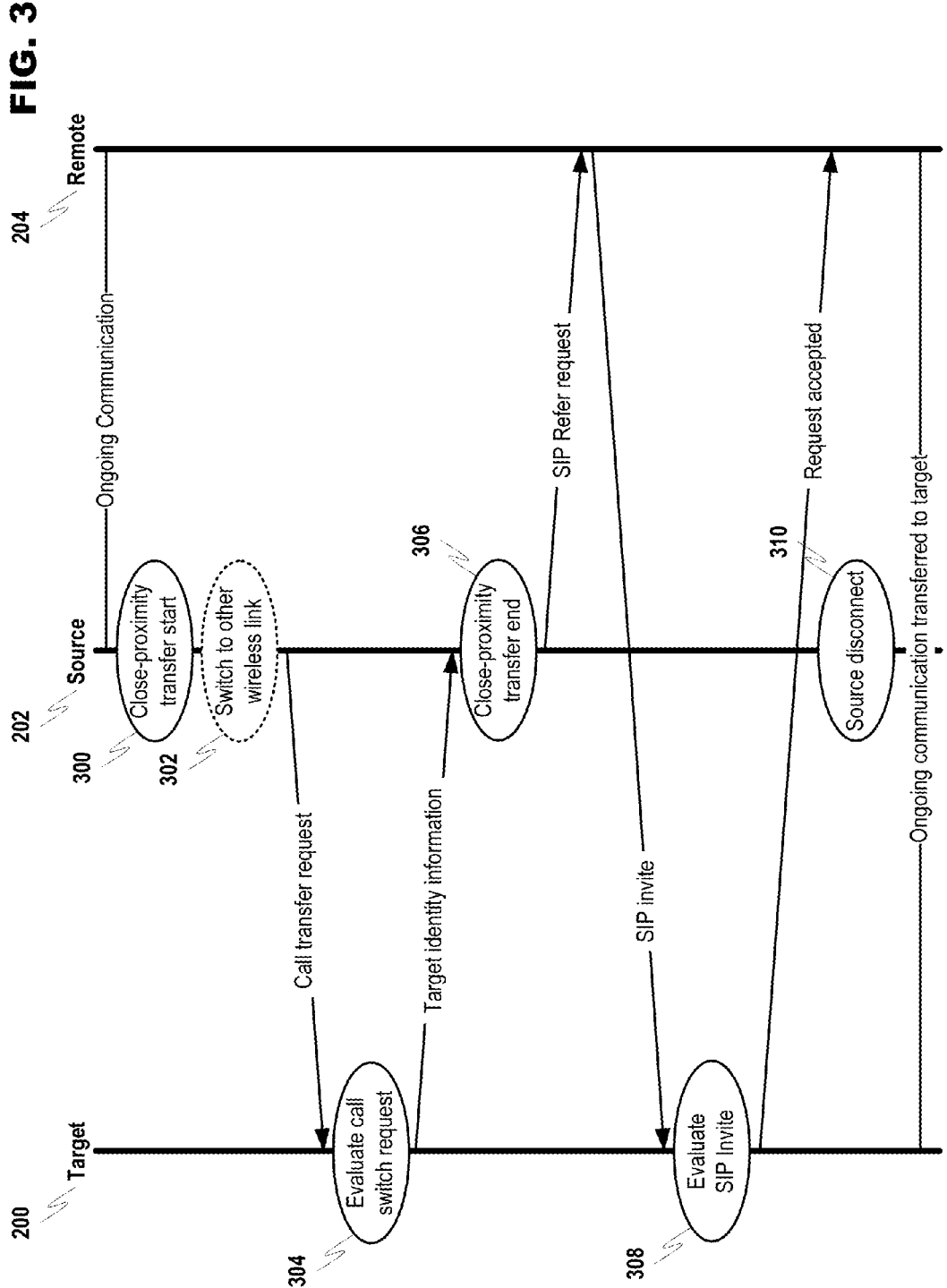
FIG. 3 discloses example activities when transferring a communication session between apparatuses in accordance with at least one embodiment of the present invention.

An example wireless interaction is disclosed in FIG. 3 as a series of activities that may occur between target 200, source 202 and remote entity 204. In an example implementation there may be an ongoing communication session (e.g., voice call, video call, etc.) between source 202 and remote entity 204. Remote entity 204 may be an apparatus that is not required to be able to interact via close-proximity wireless communication. For example, remote entity 204 may be a mobile or stationary apparatus that communicates with source 202 via a wired connection (e.g., PSTN, VoIP, etc.) or a wireless connection (e.g., GSM, CDMA, etc.). A user of source 202 may desire to transfer a call to another apparatus (e.g., target 200). While in FIG. 3 both source 202 and target 200 may be NFC-enabled, the various embodiments of the present invention are not limited specifically to operating using NFC. NFC interaction has been utilized only for the sake of explanation herein. Other forms of close-proximity wireless communication may be used in a similar manner as disclosed, in accordance with various embodiments of the present invention.

Source 202 may then be put into close proximity to target 200 (e.g., within NFC wireless operational range) in order to initiate close-proximity transfer as shown at 300. An NFC touch event (e.g., a close-proximity wireless interaction between target 200 and source 202) may, in accordance with at least one embodiment of the present invention, cause source 202 (e.g., via a software application running on source 202), to determine whether it currently is involved in an active communication session. In the example of FIG. 3 source 202 is already involved in a communication session. It may also be possible that, during the touch event disclosed at 300, address information for an alternative form of wireless communication may be exchanged as disclosed in optional activity 302. For example, Bluetooth address information for source 202 and target 200 may be exchanged, allowing these apparatuses to reengage in communication over a Bluetooth link, and for activities 308-310 to be carried out over the Bluetooth link. At least one advantage of such operation is that Bluetooth can provide higher data capacity over longer distances than close-proximity wireless communications like NFC. In some instances there may be a substantial amount of configuration information to be conveyed from target 200 to source 202 prior to initiating a transfer of the communication session, and the requirement of keeping the apparatuses in close-proximity for the time needed to convey this information via close-proximity wireless communication (e.g., via NFC) may prove burdensome to a user.

Regardless of whether conveyed via close-proximity wireless communication or another form of wireless communication, source 202 may then communicate with target 200 to request identity information from the call control entity in target 200. Target 200 may then evaluate transfer request at shown at 304 and may respond to the request. Target 200 may decline the request for reasons such as, but not limited to, automatic call transfer not being supported in target 200, security settings preventing acceptance by target 200, current condition of target 200 (e.g., the apparatus is too busy, low on power, etc.), apparatus configuration (e.g., automatic call transfer has been manually disabled), etc. If accepted, the response to the request may include transmitting the requested identity information (e.g., E.164 address, SIP address, UR address, Skype id, etc.) to source 202 via close-proximity wireless communication (e.g., NFC) or via an alternative form of wireless communication, such as Bluetooth, as discussed at 302. Close-proximity transfer operations may then be complete as shown in FIG. 3 at 306.

Source 202 may then initiate a call transfer operation directed at transferring the communication session to target 200. However, the actual transfer procedure may depend on the particular call control protocol being employed. For example, FIG. 3 shows an example of SIP communication, wherein target 200 may provide target identity information to source 202, which may then use the identity information in referred-by and refer-to headers when source 202 sends a SIP REFER request to remote entity 204. If remote entity 204 approves the SIP request (e.g., supports the requested transfer operation, has no security concerns, etc.), remote entity 204 may then respond with an SIP INVITE transmitted to target 200. Target 200 may then evaluate the SIP INVITE message (e.g., may use the token in Referred-by in SIP INVITE to determine the permission to accept the request) as shown at 308. If permission exists to accept the request, the communication session may be transferred so that the communication session is reestablished between remote entity 204 and target 200, and the communication session that exists between source 202 and remote entity 204 may be discontinued (e.g., source 202 may be disconnected as shown at 310).

In accordance with at least one embodiment of the present invention, if when the close-proximity interaction (e.g., an NFC touch) occurs a communication session exists between source 202 and remote entity 204, a user interface in target 200 may first check if automatic call transfer is enabled or supported. If supported, call transfer can be initiated automatically or upon user confirmation, if required. If not supported, the user interface of target 200 may check if a call transfer user interface application is running in the foreground (e.g., the application that has focus, is currently being displayed of the apparatus, that currently has full access to apparatus resources, etc.) in target 200. If the call transfer user interface application is running in the foreground, call transfer may be initiated automatically or upon user confirmation, if required. Otherwise, a user interface in target 200 may present a list of possible actions to the apparatus user including, for example, the ability to manually select how to conduct the transfer of the communication session (e.g., manually selecting to accept a transfer request from a source 202).

Figure 4:
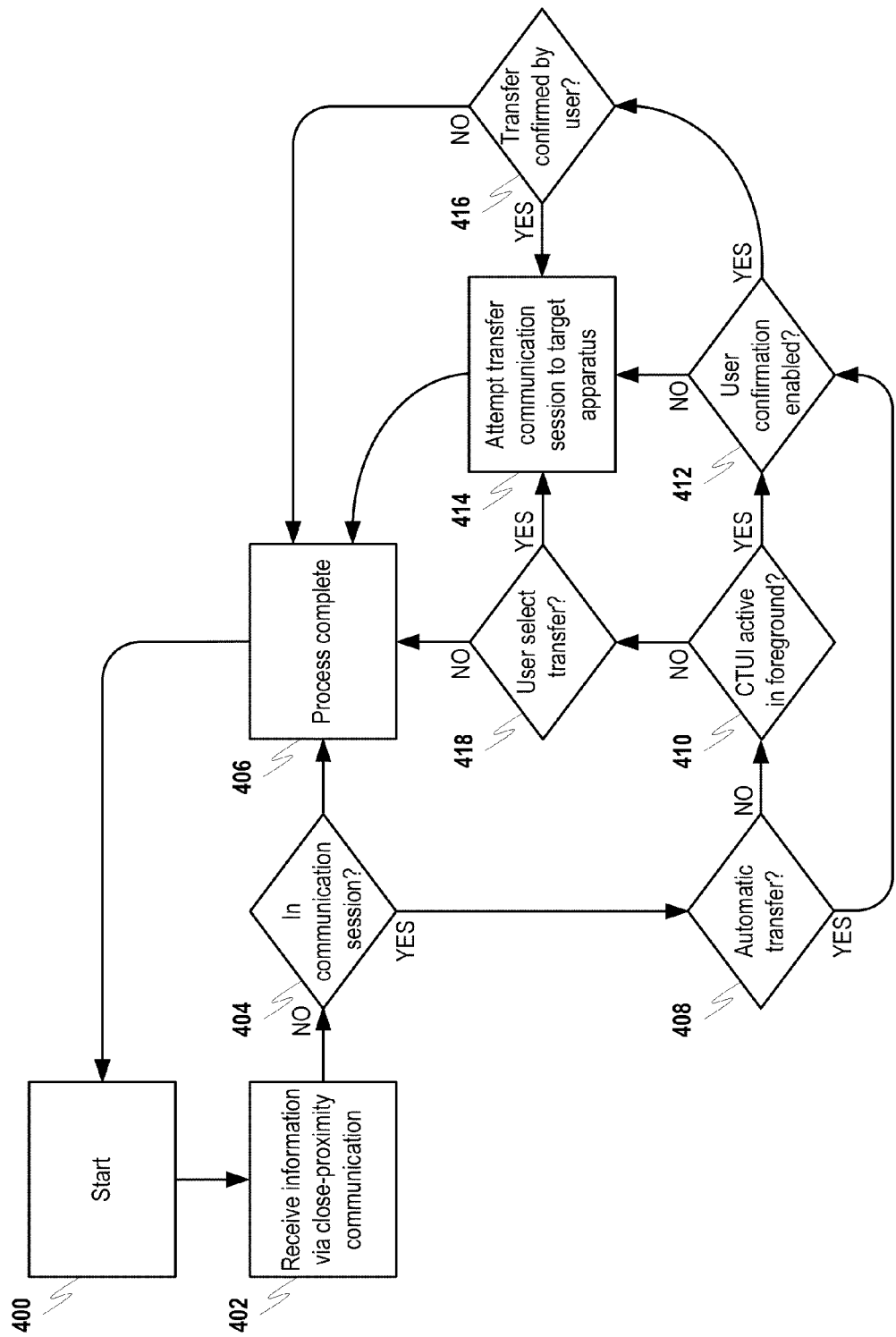
FIG. 4 discloses a flowchart of an example communication process in accordance with at least one embodiment of the present invention.

A flowchart of an example process, in accordance with at least one embodiment of the present invention, is disclosed in FIG. 4. The process may initiate in step 400, which may be followed by step 402 wherein information comprising at least information identifying a target apparatus is received in a source apparatus as a result of a touch event (e.g., interaction via close-proximity wireless communication that may be initiated by either apparatus). The receipt of the identity information may then trigger a determination of whether the source apparatus is already engaged in a communication session with another apparatus (e.g., a remote entity) in step 404. If it is determined in step 404 that a communication session does not already exist, then the process may be complete in step 406 and may reinitiate in step 400 in preparation for the close-proximity wireless communication. On the other hand, if it is determined that the source apparatus is in a communication session then the process may proceed to step 408 wherein a determination may be made as to whether automatic transfer is configured in the source apparatus. Automatic transfer may cause the source to, upon receiving target identity information via close-proximity wireless communication, automatically transmit a transfer request comprising at least the target identity information to the remote entity followed by terminating the existing communication session with the remote entity. If automatic transfer is determined to be configured in the source apparatus, the process may proceed to step 412 wherein a further determination may be made as to whether user confirmation is enabled (e.g., whether the source apparatus requires a user to confirm the communication session transfer via, for example, a user interface informing the user of the pending transfer). If it is determined in step 412 that user confirmation is not enabled, the process may proceed to step 414 wherein the attempted transfer of the communication session to the target apparatus may proceed (e.g., such as further disclosed in the example flowchart of FIG. 5). The process may then be complete in step 406 and reinitiate in step 400.

Returning to step 412, if a determination is made that user confirmation is enabled in the source, the process may move to step 416 wherein a further determination may be made as to whether the transfer is confirmed by the user (e.g., the user manually enters confirmation of the transfer in a user interface displayed for the user by the source). If it is determined in step 416 that the user confirms the transfer, the process may return to step 414 where an attempted transfer of the communication session may occur (e.g., such as further disclosed in the example flowchart of FIG. 5). Otherwise, if in step 416 a determination is made that the user did not confirm the transfer, the process may be complete in step 406 and may reinitiate in step 400.

Returning to step 408, if it is determined that automatic transfer is not configured the process may move to step 410 wherein a further determination may be made as to whether a communication transfer user interface (CTUI) is active (e.g., running in the foreground) in the source. If it is determined in step 414 that the CTUI is active then the process may again move to step 412 wherein a determination may be made as to whether user confirmation is enabled. The process may then proceed from step 412 as previously set forth above. Otherwise, if it is determined in step 410 that the CTUI is not active in the foreground, the process may proceed to step 418 wherein a determination may be made as to whether the user may manually configure the desired communication session transfer in the source. This determination may be made based on whether, for example, manual configuration resources (e.g., user interface menus) are available in the source with which the user may select the apparatus (e.g., the target) to which the communication session should be transferred. If in step 418 it is determined that no resources are provided with which the user may select the apparatuses involved in the transfer, the process may be complete in step 406 and may reinitiate in step 400. Otherwise, the process may return to step 414 wherein a transfer of the communication session may be attempted (e.g., as shown in the example flowchart further disclosed in FIG. 5). The process may then proceed from step 414 as previously described.

Figure 5:
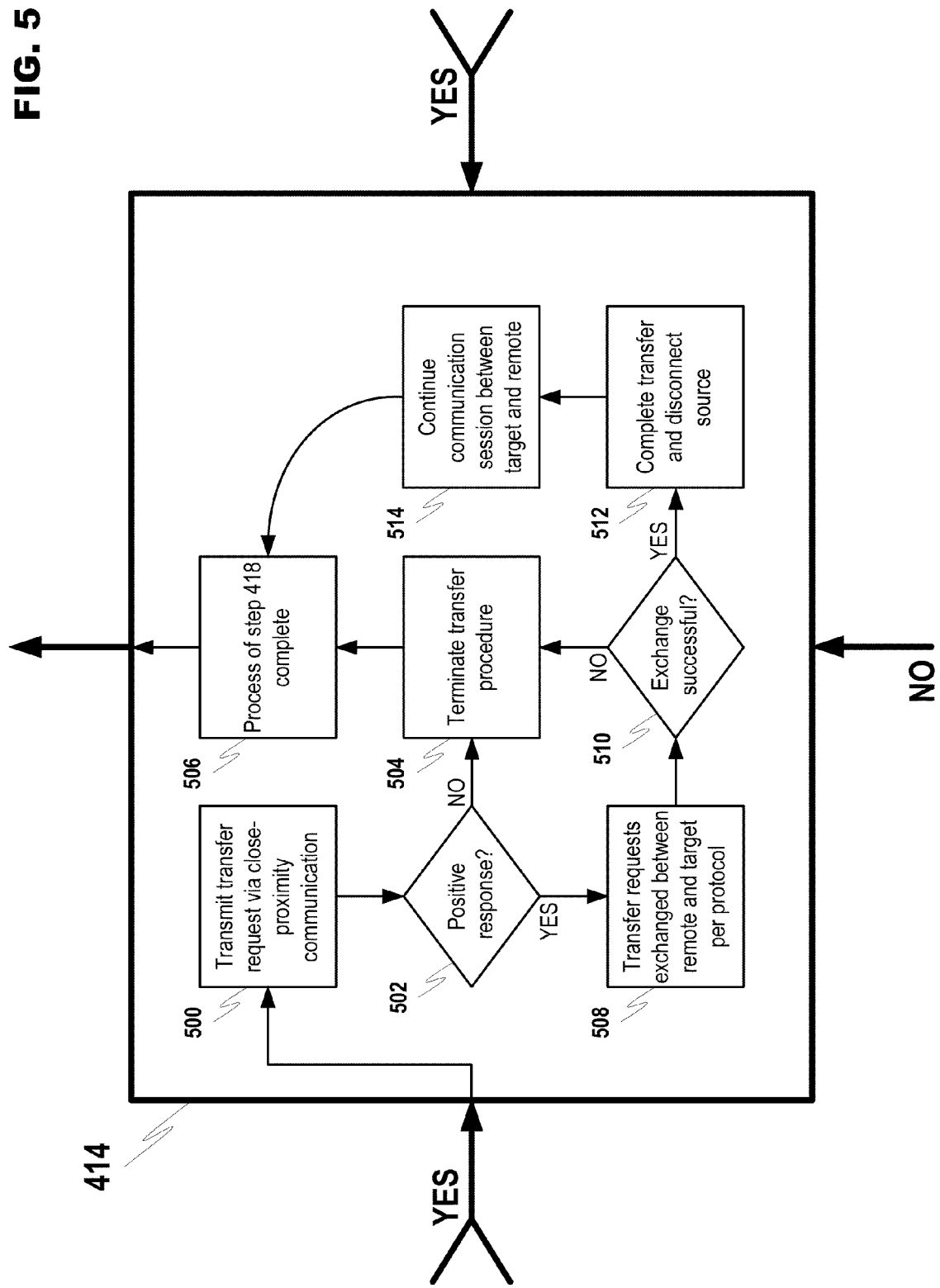
FIG. 5 discloses additional detail regarding step 414 of FIG. 4 in accordance with at least one embodiment of the present invention.

In accordance with at least one embodiment of the present invention, an example process that provides detail with respect to the steps that may occur in step 414 of FIG. 4 are disclosed in FIG. 5. The process of FIG. 5 may start in step 500 wherein a transfer request is transmitted from the source to the target via close-proximity wireless communication (e.g., via NFC). A determination may then be made in step 502 as to whether a positive response is received from the target in the source. If it is determined in step 502 that a positive response is not received (e.g., the target has rejected or not responded to the transfer request) the attempted transfer procedure of step 414 may be terminated in step 504 and the process of step 418 may be complete in step 506. On the other hand, if in step 502 it is determined that a positive response has been received in the source, the process may proceed to step 508 wherein transfer request messages may be exchanged between the source, remote entity and target. A determination may then be made in step 510 as to whether the transfer message exchange is successful. If it is determined in step 510 that the exchange of transfer messages was not successful (e.g., either the remote entity or the target rejected the transfer requests) the attempted transfer procedure of step 414 may again terminate in step 504 and may be complete in step 506. Otherwise, if the exchange was determined to be successful in step 510, the process may move to step 512 wherein the communication session may be reestablished between the target and the remote entity, and the existing communication session between the source and remote entity may be terminated. The process may then proceed to step 514 where the communication session may be continued between the target and remote entity. The successful transfer process of step 414 may again be complete in step 506 and the process described in step 406 of FIG. 4 may proceed.

It is important to note that the actual messages exchanged between the various apparatuses may depend on the protocol used by the ongoing call. If the message exchange fails the call transfer procedure is terminated. If the message exchange is successfully completed the ongoing call may be transferred, and it will continue between the target and remote entity. The Connection Handover protocol can be used when the request and response messages that are used to initiate the call transfer are exchanged over NFC. Other usable mechanisms may include the exchange of messages between the source and target apparatuses using SNEP (e.g., Simple NFC Forum Data Exchange Format (NDEF) Exchange Protocol) as defined by NFC Forum. In the previously disclosed examples, the Call Switch request can be carried as "alternate record" inside a Handover Request message. The response from the Target may then be carried as "alternate carrier" inside a Handover Select message. If the Handover Select Message contains a positive response (e.g., the call transfer is a valid 'carrier' for both apparatuses) then the call transfer may be initiated. The actual content of the alternate carrier for call switch and an example of its binary content is not reported.

In accordance with at least one embodiment of the present invention, there may also be instances where the source may not initiate the call switch procedure. For example, the target may send an unsolicited Handover Select message, or another type of NDEF message (e.g., using SNEP), containing the information to initiate a call transfer, although the target may not know if the source has an ongoing call. If the source is engaged in a communication session, it is up to the source to decide whether to accept or reject the call transfer. Alternatively, the Source may push the Remote entity's address and other possible tokens to the target over NFC, and the target may then initiate the call transfer towards the remote entity. In cases wherein SIP communication is being employed, the source may send the destination address (e.g., SIP, URI or Globally Routable UA URI (GRUU)) and also any tokens that will be needed by the remote entity to eventually to determine who has originally initiated the call transfer (e.g., source identity: SIP, telephone, URI) and the identity of the ongoing session between the source and remote (e.g., SIP call-ID). These tokens may then be used by the target to populate the SIP request. Accordingly, the target may send a SIP INVITE request where the Referred-by and Replaces headers contain the tokens as received from the source via NFC (e.g., Source identity and SIP call-ID correspondingly). The request-URI of the INVITE may be set to the Remote address (GRUU) that was received via NFC interaction.

For identities in SIP, the SIP GRUU may identify an actual SIP apparatus whereas SIP URI is more common and may identify a user who may own multiple devices. GRUU is a SIP URI, but not always vice versa. It may then be preferred to use GRUU in most cases in order to reach the same device where the NFC originated. NFC communication here may refer to the communication over the P-2-P NFC mode of operation. Peer to peer and LLCP as protocol may be used to exchange relevant information/parameters between the source and target, depending on the type of protocol being used. Furthermore, in accordance with at least one embodiment of the present invention the source may be NFC enabled, while the Target has only an NFC tag associated with it. The NFC tag may contain the information related to the target, and the source may use that information in at least two different modes. In one case the tag may contain a radio address (e.g., Bluetooth address) of the target. The source and the target may then establish a Bluetooth session to exchange identity and other information for the transfer.

In another example implementation, the source may have an NFC tag (or may be able to emulate an NFC Tag) and the Target device may be NFC-enabled. For example, the tag may contain a radio address (e.g., Bluetooth address) for the source. The source and target may then establish a Bluetooth session to exchange identity and other information for the transfer.

In another example implementation a tag associated with the target may contain identity information relevant to the target that may be read by the source and passed to a remote server. The remote server may then contact the target and complete the call transfer procedure. The remote server may be, for example, a mobile switching center (MSC) that executes the call transfer (e.g., as an explicit call transfer (ECT). In this instance, the source may initiate a new call to using the target's E.164 address, and when the target alerts the user for the incoming call the source may send the ECT request to the MSC in a facility message as defined in TS 24.091.

The various embodiments of the present invention are not limited only to the examples disclosed above, and may encompass other configurations or implementations.

For example, embodiments of the present invention may encompass a first apparatus comprising means for receiving information including at least identity information corresponding to a second apparatus via close-proximity wireless communication, means for triggering, in response to receiving the identity information, a determination as to whether the first apparatus is already in a communication session, means for, if it is determined that the first apparatus is already in a communication session, determining whether automatic transfer of the communication session to the second apparatus is permitted based on the identity information, and means for, if it is determined that the automatic transfer is permitted, initiating a transfer of the communication session to the second apparatus.

At least one other example embodiment of the present invention may include electronic signals that cause a first apparatus to receive information including at least identity information corresponding to a second apparatus via close-proximity wireless communication, trigger, in response to receiving the identity information, a determination as to whether the first apparatus is already in a communication session, if it is determined that the first apparatus is already in a communication session, determine whether automatic transfer of the communication session to the second apparatus is permitted based on the identity information, and if it is determined that the automatic transfer is permitted, initiate a transfer of the communication session to the second apparatus.

Accordingly, it will be apparent to persons skilled in the relevant art that various changes in form a and detail can be made therein without departing from the spirit and scope of the invention. The breadth and scope of the present invention should not be limited by any of the above-described example embodiments, but should be defined only in accordance with the following claims and their equivalents.

What is claimed:

1. A method, comprising:
    receiving, at a first apparatus, information including at least identity information corresponding to a second apparatus via close-proximity wireless communication;
    triggering, in response to receiving the identity information in the first apparatus, a determination as to whether the first apparatus is already in a communication session;
    if it is determined that the first apparatus is already in a communication session, determining whether automatic transfer of the communication session from the first apparatus to the second apparatus is permitted based on the identity information; and
    if it is determined at the first apparatus that the automatic transfer is permitted, initiating a transfer, by the first apparatus, of the communication session from the first apparatus to the second apparatus.

2. The method of claim 1, wherein the identity information is received at the first apparatus in response to a message requesting the identity information that was transmitted from the first apparatus to the second apparatus via close-proximity wireless communication.

3. The method of claim 1, wherein the identity information comprises an address usable for communicating with the second apparatus via another form of wireless communication.

4. The method of claim 3, wherein the other form of wireless communication is Bluetooth.

5. The method of claim 3, further comprising receiving additional information in the first apparatus from the second apparatus via the other form of wireless communication, the additional information comprising configuration information usable for transferring the communication session from the first apparatus to the second apparatus.

6. The method of claim 1, further comprising, if it is determined at the first apparatus that automatic transfer of the communication session is not permitted, determining whether a transfer-related user interface application is active in the first apparatus, and if the transfer-related user interface application is determined to be active, whether the transfer-related user interface application requires user confirmation.

7. The method of claim 6, further comprising, if it is determined that the transfer-related user interface application requires user confirmation, displaying information on the first apparatus, the information inquiring as to whether transferring the communication session is permitted.

8. The method of claim 1, wherein initiating a transfer, by the first apparatus, of the communication session from the first apparatus to the second apparatus comprises:
    transmitting a message from the first apparatus to a remote entity, the message requesting transfer of the communication session to the second apparatus;
    receiving a response message from the remote entity at the first apparatus;
    determining whether transfer of the communication session is permitted based on the response message; and
    if it is determined at the first apparatus that transfer of the communication session is permitted, terminating the communication session in the first apparatus.

9. A computer program product comprising computer executable program code recorded on a non-transitory computer readable storage medium, the computer executable program code comprising:

code configured to cause a first apparatus to receive information including at least identity information corresponding to a second apparatus via close-proximity wireless communication;

code configured to cause the first apparatus to trigger, in response to receiving the identity information, a determination as to whether the first apparatus is already in a communication session;

code configured to cause the first apparatus to, if it is determined that the first apparatus is already in a communication session, determine whether automatic transfer of the communication session to the second apparatus is permitted based on the identity information; and code configured to cause the first apparatus to, if it is determined that the automatic transfer is permitted, initiate a transfer of the communication session to the second apparatus.

10. The computer program product of claim 9, wherein the code is configured to cause the first apparatus to receive the identity information in response to a message requesting the identity information that was transmitted from the first apparatus to the second apparatus via close-proximity wireless communication.

11. The computer program product of claim 9, wherein the identity information comprises an address usable for communicating with the second apparatus via another form of wireless communication.

12. The computer program product of claim 11, wherein the other form of wireless communication is Bluetooth.

13. The computer program product of claim 11, further comprising code configured to cause the first apparatus to receive additional information from the second apparatus via the other form of wireless communication, the additional information comprising configuration information usable for transferring the communication session from the first apparatus to the second apparatus.

14. The computer program product of claim 9, further comprising code configured to cause the first apparatus to, if it is determined that automatic transfer of the communication session is not permitted, determine whether a transfer-related user interface application is active, and if the transfer-related user interface application is determined to be active, whether the transfer-related user interface application requires user confirmation.

15. The computer program product of claim 14, further comprising code configured to cause the first apparatus to, if it is determined that the transfer-related user interface application requires user confirmation, display information inquiring as to whether transferring the communication session is permitted.

16. The computer program product of claim 9, wherein the code configured to cause the apparatus to initiate a transfer of the communication session from the first apparatus to the second apparatus comprises:

code configured to cause the first apparatus to transmit a message to a remote entity, the message requesting transfer of the communication session to the second apparatus;

code configured to cause the first apparatus to receive a response message from the remote entity;

code configured to cause the first apparatus to determine whether transfer of the communication session is permitted based on the response message; and code configured to cause the first apparatus to, if it is determined that transfer of the communication session is permitted, terminate the communication session in the first apparatus.

17. A first apparatus, comprising:

at least one processor; and at least one memory including executable instructions, the at least one memory and the executable instructions being configured to, in cooperation with the at least one processor, cause the first apparatus to perform at least the following:

receive information including at least identity information corresponding to a second apparatus via close-proximity wireless communication;

trigger, in response to receiving the identity information, a determination as to whether the first apparatus is already in a communication session;

if it is determined that the first apparatus is already in a communication session, determine whether automatic transfer of the communication session to the second apparatus is permitted based on the identity information; and if it is determined at the first apparatus that the automatic transfer is permitted, initiate a transfer of the communication session to the second apparatus.

18. The first apparatus of claim 17, wherein the at least one memory and the executable instructions being configured to, in cooperation with the at least one processor, cause the first apparatus to receive the identity information in response to a message requesting the identity information that was transmitted from the first apparatus to the second apparatus via close-proximity wireless communication.

19. The first apparatus of claim 17, wherein the identity information comprises an address usable for communicating with the second apparatus via another form of wireless communication.

20. The first apparatus of claim 19, wherein the other form of wireless communication is Bluetooth.

21. The first apparatus of claim 19, further comprising the at least one memory and the executable instructions being configured to, in cooperation with the at least one processor, cause the first apparatus to receive additional information from the second apparatus via the other form of wireless communication, the additional information comprising configuration information usable for transferring the communication session from the first apparatus to the second apparatus.

22. The first apparatus of claim 17, further comprising the at least one memory and the executable instructions being configured to, in cooperation with the at least one processor, cause the first apparatus to, if it is determined at the first apparatus that automatic transfer of the communication session is not permitted, determine whether a transfer-related user interface application is active, and if the transfer-related user interface application is determined to be active, whether the transfer-related user interface application requires user confirmation.

23. The first apparatus of claim 22, further comprising the at least one memory and the executable instructions being configured to, in cooperation with the at least one processor, cause the first apparatus to, if it is determined that the transfer-related user interface application requires user confirmation, display information inquiring as to whether transferring the communication session is permitted.

24. The first apparatus of claim 17, wherein the at least one memory and the executable instructions being configured to, in cooperation with the at least one processor, cause the first apparatus to initiate a transfer of the communication session from the first apparatus to the second apparatus comprises the at least one memory and the executable instructions being configured to, in cooperation with the at least one processor, cause the first apparatus to:
- transmit a message to a remote entity, the message requesting transfer of the communication session to the second apparatus;
- receive a response message from the remote entity;
- determine whether transfer of the communication session is permitted based on the response message; and
- if it is determined that transfer of the communication session is permitted, terminate the communication session in the first apparatus.

25. A system, comprising:
- a first apparatus; and
- a second apparatus;
- the first apparatus receiving information including at least identity information corresponding to the second apparatus via close-proximity wireless communication and triggering, in response to receiving the identity information, a determination as to whether the first apparatus is already in a communication session;
- the first apparatus further, if it is determined that the first apparatus is already in a communication session, determining whether automatic transfer of the communication session to the second apparatus is permitted based on the identity information, and if it is determined that the automatic transfer is permitted, initiating a transfer of the communication session to the second apparatus.

* * * * *